United States Patent [19]
Placek

[11] 3,963,417
[45] June 15, 1976

[54] METHOD AND APPARATUS FOR REMOVING SOLID TIRES FROM RIMS

[75] Inventor: Eugene W. Placek, Middleburg Heights, Ohio

[73] Assignee: International Magna Corporation, Cleveland, Ohio

[22] Filed: Dec. 26, 1974

[21] Appl. No.: 536,487

[52] U.S. Cl. ............................. 432/225; 432/232; 432/224
[51] Int. Cl.² ............................................. F24J 3/00
[58] Field of Search .................. 432/3, 10, 76, 224, 432/225, 226, 227, 230, 232; 228/51, 59; 219/523

[56] References Cited
UNITED STATES PATENTS

| | | | |
|---|---|---|---|
| 314,388 | 3/1885 | Mansfield | 432/225 |
| 323,686 | 8/1885 | Hoyt | 432/225 |
| 334,952 | 1/1886 | Hoyt | 432/225 |
| 470,678 | 3/1892 | Jenks | 432/232 |
| 471,802 | 3/1892 | Parkinson | 432/225 |
| 681,213 | 8/1901 | Gleazen | 432/232 |
| 811,026 | 1/1906 | Bancroft | 432/232 |
| 1,082,515 | 12/1913 | Gogel | 432/225 |
| 1,956,519 | 4/1934 | Thomson | 432/10 |
| 3,814,573 | 6/1974 | Karlovetz | 431/329 |

*Primary Examiner*—John J. Camby
*Assistant Examiner*—Henry C. Yuen
*Attorney, Agent, or Firm*—Allen Owen

[57] ABSTRACT

A method and apparatus for removing solid tires from tubular rim bands is disclosed. A transverse cut is first made through the annular rubber tire, then the tubular rim band is heated at its inside surface to a temperature high enough to break the bond between the tire and the outer surface of the band. Also disclosed is an apparatus utilizing gas-fired infrared heat to effect the heating of the rim band.

5 Claims, 4 Drawing Figures

U.S. Patent June 15, 1976 3,963,417
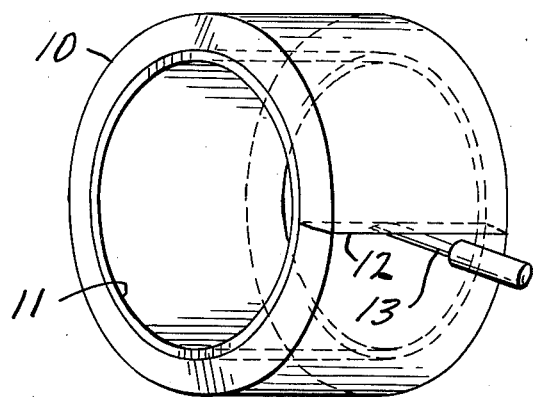
FIG-1-
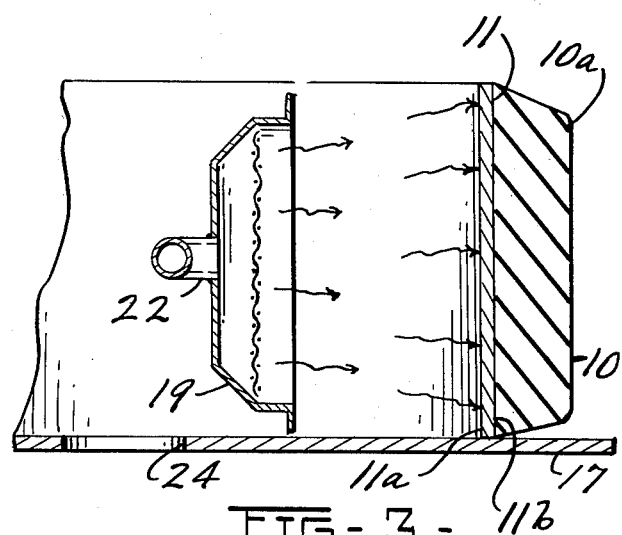
FIG-3-
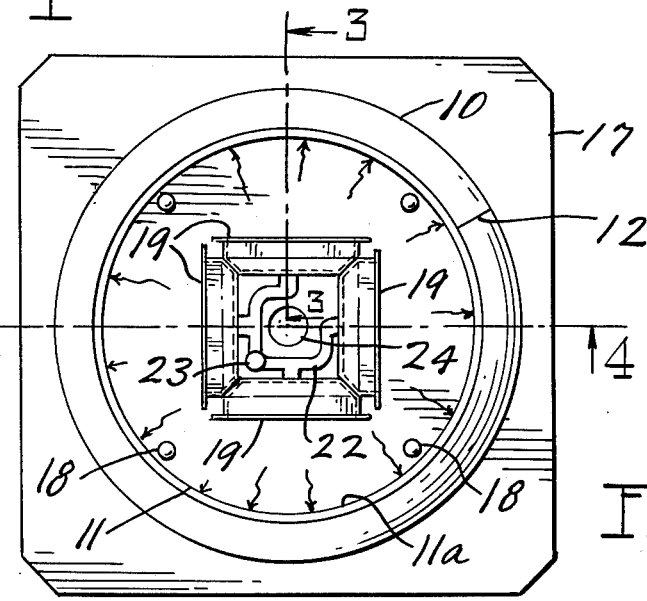
FIG-2-
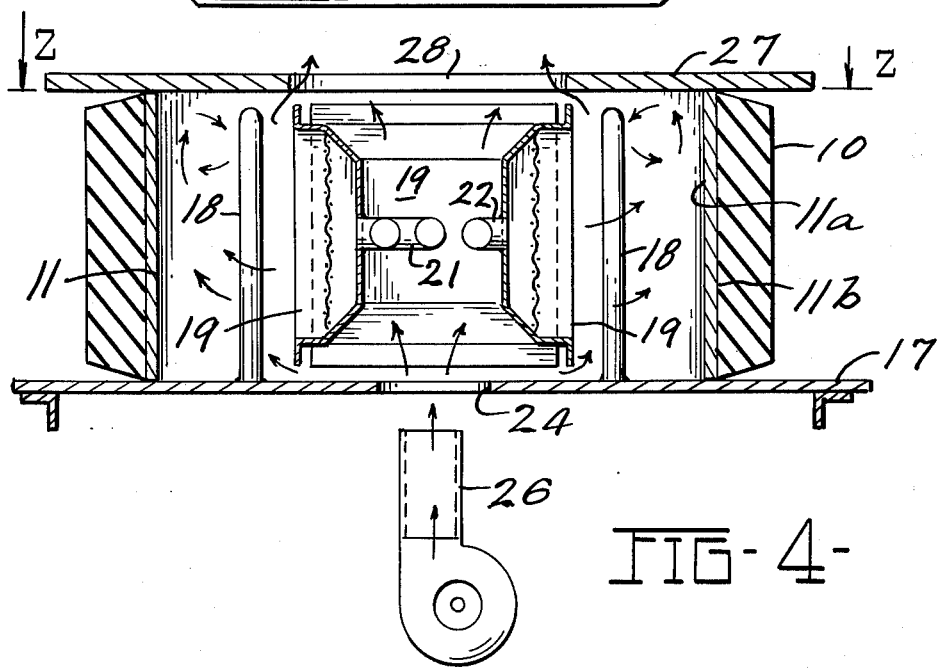
FIG-4-

METHOD AND APPARATUS FOR REMOVING SOLID TIRES FROM RIMS

BACKGROUND OF THE INVENTION

The invention relates to the removal of solid tires, such as those used on industrial trucks, from the rims to which they are bonded, and more particularly to an economical and nearly pollution-free method and apparatus for effecting such removal.

The wheels of industrial trucks generally include an endless solid rubber (or synthetic rubber or plastic) tire sleeve molded and bonded onto a cylindrical band of seamless steel tubing which serves as a rim for the tire. The rim, in turn, is pressed with great force onto a wheel hub of the truck. The rubber tire is generally in a high degree of tension on the rim band. It is molded onto the band under high pressure and temperature, so that under ambient conditions, the tire goes into tension. A bonding adhesive agent is generally used between the rim and the tire, and during the molding and curing process, the tire is tightly bonded to the rim.

When the tread of the solid tire is worn down, the rim band and tire are removed from the wheel hub and replaced with a rim carrying a new tire. At this point, the worn tire may be removed from its rim by various means for salvage and re-use. Formerly, burning of the rubber tire off the steel rim was in wide use. However, the use of this method tended to distort the rim band due to the high and uneven temperatures, and due to the large amount of dense smoke associated with the burning away of the rubber, the burning method is now prohibited under most circumstances.

Another method sometimes used for removing the solid tires is to rotate the tire and rim and turn the rubber off the steel band with a cutting knife. Though this method is pollution-free, it creates extremely large quantities of rubber chips which must be disposed of. The turning down of one tire may result in several bushels of rubber chips. Another problem of the turning method is that many industrial tires become impregnated with hundreds of fragments of stone and metal. When the tires are removed by the turning method, the cutting knives employed for the process are rapidly worn down and often destroyed. Such great expense is thus involved that it is often not economical to salvage the rim bands by this method.

Other methods in wide use today for salvaging steel rim bands include heating of the tire and rim in various chemical baths. Boiling oil is sometimes used for the bath but more often a molten lead bath is provided. The tire and rim are dipped in the molten lead, whereby they are uniformly heated and the rubber tire is largely burned away. The method necessitates costly skimming operations to remove refuse material from the surface of the molten lead. Also, like the rubber burning method but to a lesser extent, the boiling method results in a large volume of dense smoke as the rubber is burned.

Because of the difficulties, pollution problems and expense of the foregoing methods, including both capital expenditures and operating expenses, many suppliers of industrial solid truck tires simply discard the entire rim and tire when the tire tread is worn to the point of replacement.

SUMMARY OF THE INVENTION

The present invention provides a method of and apparatus for easily and economically removing solid tires from cylindrical rim bands, whereby the rim band and tire material itself may be salvaged. The process involves no smoke or negligible amount of smoke and is economical both to implement and to operate.

According to the method of the invention, a rim-mounted solid tire is first severed along a line generally transverse to its circumference, preferably by using a cutting saw or knife. The rim band is then locally heated by application of heat to its inside surface only. Heating is continued until the outside surface of the rim band, at the bonding interface with the rubber tire, reaches a temperature sufficiently high to break the bond, or until the cylindrical rim has undergone sufficient thermal expansion to break the bond by slipping away from the strip of rubber tire. Either event may occur first to break the bond between the tire and the rim. As the bond, which generally involves a bonding agent as discussed above, deteriorates under high temperature, a very small amount of smoke may appear. Any such smoke represents the burning away of the bonding agent.

When the bond has been broken, the unburned rubber tire strip is easily removed. The heated rim is then cooled preferably by quenching in a water bath. The steel rim band may be reused for mounting a new tire, and the used rubber tire strip may be utilized in various ways, such as for a marine bumper.

The temperature to which steel rim bands are brought under the method of the invention is significantly lower than the temperatures involved in methods utilizing molten baths and direct flame burning of the rubber. This adds to the economy of the present process and also helps protect the steel rims from distortion and molecular reorientation which can occur at extreme temperatures.

The rim heating method of the invention is preferably carried out by radiated heat. The preferred apparatus for generating the required heat radiation comprises an annularly arranged bank of gas-fired infrared generators positioned inside the rim band, which is positioned on a support surface with its axis oriented generally vertically. For fully advantageous use of the heat generated by the infrared burners, a cover plate having a central opening may be laid over the open upper side of the rim so that a substantial outer portion of the opening is covered and a central exhaust gas opening is defined. This provides for the circulation of flue gases in the space adjacent the inside of the rim such that the gases aid in heating by convection and are reheated to act as radiant elements themselves, also aiding in heating and economizing on fuel. Also, a central opening is provided in the support surface below, so that cooling air is admitted upwardly into the space defined on the inside of the bank of infrared heaters to cool the heater bodies. A blower may additionally be provided below the support surface to aid in the movement of air up through the support surface opening.

DESCRIPTION OF THE DRAWINGS

FIG. 1 is a perspective view of a solid tire supported by a tubular rim band, with the tire shown transversely severed;

FIG. 2 is a plan view of the tire and rim band and apparatus according to the invention for heating the rim band;

FIG. 3 is a sectional view taken along the line 3—3 of FIG. 2; and

FIG. 4 is a sectioned elevational view taken along the line 4—4 of FIG. 2.

DESCRIPTION OF THE PREFERRED EMBODIMENT

FIG. 1 shows a solid tire 10 molded onto a tubular band rim 11, which is usually of steel. The tire 10 has been severed along a line 12, preferably by cutting with a knife 13 or a specially designed, lubricated saw (not shown) transversely to its circumference, according to the method of the invention. It should be understood that any means for making a transverse cut through the tire 10 can be used.

FIG. 2 shows a preferred apparatus generally indicated by the reference number 16 for heating the rim band 11 to a temperature sufficient to break the bond between the band 11 and the rubber tire 10. The apparatus 16 includes a base or support 17, a plurality of guide pins 18 for the rim 11, and a bank of heating units 19 directed toward the inside surface 11a of the rim band 11. The heaters 19 are preferably gasfired infrared generators and may be of the type shown in U.S. Pat. Nos. 3,814,573 3,852,025 and 3,857,670. Although FIG. 2 shows four such heaters 19 in a generally annular array, it should be understood that additional heaters can be provided to more closely approximate a circular heating bank. Alternatively, and particularly for small diameter rim bands 11, a cylindrical infrared generator (not shown) of the type shown in my co-pending application Ser. No. 501,241 can be provided. However, it has been found that the four-heater arrangement shown in FIG. 2 is adequate to heat the rim band 11 sufficiently evenly. Infrared generation in the 3 to 4 micron wavelength range is the most readily absorbable energy available for this purpose. As shown in FIG. 2, gas-air supply lines 21 and 22 from a gas-air supply pipe 23 extending upward from below the base 17 provide the proper gas-air mixture for the heating units 19. A central opening 24, also shown in FIG. 4, may be provided in the base 17 for permitting convection of air upward through the space inside the annular arrangement of heating units 19. An air blower 26 shown in FIG. 4 may also be provided for causing air to flow upwardly through the opening 24. The purpose of the upwardly moving air is primarily to cool the heating units 19 during the heating cycle. The air flow also helps provide secondary makeup air for the heating units 19 by supplying air at the combustion surfaces.

As FIG. 4 indicates, a cover plate 27 is preferably provided for trapping and partially recirculating flue gases associated with combustion in the heating units 19. The cover plate 27 rests upon and covers the circular rim band 11, with a circular central opening 28 for exhaust of both cooling air and spent combustion gases from the burners 19. As shown by the flow arrows of FIG. 4, flue gases emitted from the infrared generators 19 travel upwardly adjacent the rim band 11 and are caused by the cover plate 27 to be partially recirculated downward close to the faces of the generators 19. The flue gases generally include carbon dioxide, nitrogen, steam, and to a lesser extent hydrogen and oxygen molecules. Such recirculation of the flue gases not only extracts extra heat from the burners 19 by convection, but also provides additional radiant heat for heating the rim 11 by reheating the flue gases by radiation. Some of the flue gas molecules, particularly hydrogen and oxygen molecules, are heated to the extent that the molecules themselves become radiant sources and radiate infrared heat toward the rim surface 11a. The reheated and reburned gases, along with a portion of the remaining flue gases, pass upwardly and exhaust through the opening 28 in the cover plate 27.

FIG. 3, a sectional view taken along the line 3—3 of FIG. 2, illustrates an infrared heating unit 19 radiating heat to the inner surface 11a of the steel rim band 11. During an operation of the apparatus 16 according to the method of the invention, it was found that the inside surface 11a of the rim band 11 reached a temperature of 500°F, and the outside surface 11b of the rim reached a simultaneous maximum temperature of 275°F. This outside temperature was found to be sufficient to release the bond between the rubber tire 10 and the rim band 11 for nearly all solid tires. At the maximum temperature, the outer surface 10a of the rubber tire 10 was only slightly above room temperature. An important feature of the invention lies in the fact that the temperatures reached within the rim band 11 were significantly below temperatures required to cause distoriton of the band or molecular reorientation within the band, which undermines the strength of the band.

The failure of the bond between the rubber tire 10 and the outer surface 11b of the rim band 11 may be caused by one or both of two influences. One influence is the temperature reached at the outer surface 11b of the rim band. The temperature on this surface may be high enough to melt or burn away the bonding agent or an extremely thin portion of the inner surface of the rubber tire 10. This alone would enable the easy removal of the tire strip 10 from the rim band 11, and the 275°F temperature has been found sufficient under most circumstances to thermally destroy the bond. The second influence causing a breakdown of the bond between the tire strip 10 and the rim band 11 is the effect of thermal expansion of the metal rim 11. During heating, the rim band 11 expands substantially while the tire strip 10 remains essentially the same length. The coefficient of thermal expansion of steel is about $5.6 \times 10^{-6}$ in./in.-°F, so that a rim band of 12-inch diameter, for example, grows in circumference by nearly one-tenth of an inch during heating to the temperatures discussed above. On the other hand, rubber has a near zero coefficient of thermal expansion. Thus, the thermal expansion influence alone is sufficient to break the bond between the tire strip 10 and the rim band 11, and this may usually be accomplished at temperatures below those required for actual burning away of the bond. However, a bond failure often occurs under a combination of the two influences.

It should be understood that any suitable type of heat can be used to heat the internal surface 11a of the rim band 11 to raise its temperature sufficiently to break its bond with the tire strip 10. For example, gas flame, electric heat or steam heat can be employed. However, gas-fired infrared radiant heat is the most efficient form of energy for this purpose. Moreover, no other type of heating allows advantage to be taken of the same flue gases present with gas-fired infrared heating.

Following the heating step discussed above, the tire strip 10 may be easily removed from the rim band 11. Since the steel bands has not been brought to extremely high temperatures as mentioned above, it can be quickly cooled by quenching without distortion or loss of steel strength.

In an automated system for removal of worn tires from rim bands and remolding of new tires on the rim bands, the heat absorbed by the rim band during the heating step can be reclaimed. The hot rim band can be quenched immediately after the heat cycle in water which is used to make steam for curing new rubber on the same band or another band in the remolding process.

The above described preferred embodiment provides economical and effective apparatus and method for removing solid tires from tubular rim bands. The method results in low cost salvage of the rim bands as has not been possible according to prior art methods. Various other embodiments and alterations to this preferred embodiment will be apparent to those skilled in the art and may be made without departing from the spirit and scope of the following claims.

I claim:

1. Apparatus for removing solid tires previously severed across their widths from circular band rims, comprising:
    a base including means for supporting the rim and tire;
    gas-fired infrared heat generating means connected to the base for heating the inside surface of the rim band around the circumference of the band; and
    means for effecting the circulation of flue gases associated with said infrared heat generating means in the interior space of the rim band,
    whereby, as the rim band is heated, it expands circumferentially to slip with respect to the tire, thereby breaking the bond between the rim band and the tire.

2. The apparatus of claim 1 wherein said flue gas circulating means includes a cover positioned over one opening of the rim band and closing that portion of the opening adjacent the rim.

3. The apparatus of claim 1 which further includes means for directing air along a substantially axial path into the interior space of the rim band.

4. The apparatus of claim 1 wherein said gas-fired infrared heat generating means comprises an array of gas-fired infrared generators positioned in the interior space of the rim band in a generally annular configuration and directed outwardly toward the interior surface of the rim band.

5. Apparatus for removing a solid tire previously severed across its width from a circular band rim by destruction of the bond between the tire and the rim, comprising a base with means for supporting the rim and tire, and a generally annular array of outwardly directed gas-fired infrared heat generators connected to the base and directed toward the inside surface of the rim band, whereby heat applied to such inside surface is conducted through the band to expand the band so that the tire is freed from the band at least in part by slippage of the tire from the expanding band.

* * * * *